A. J. SAMS.
GREASE CELLAR.
APPLICATION FILED SEPT. 25, 1916.
1,236,879.
Patented Aug. 14, 1917.
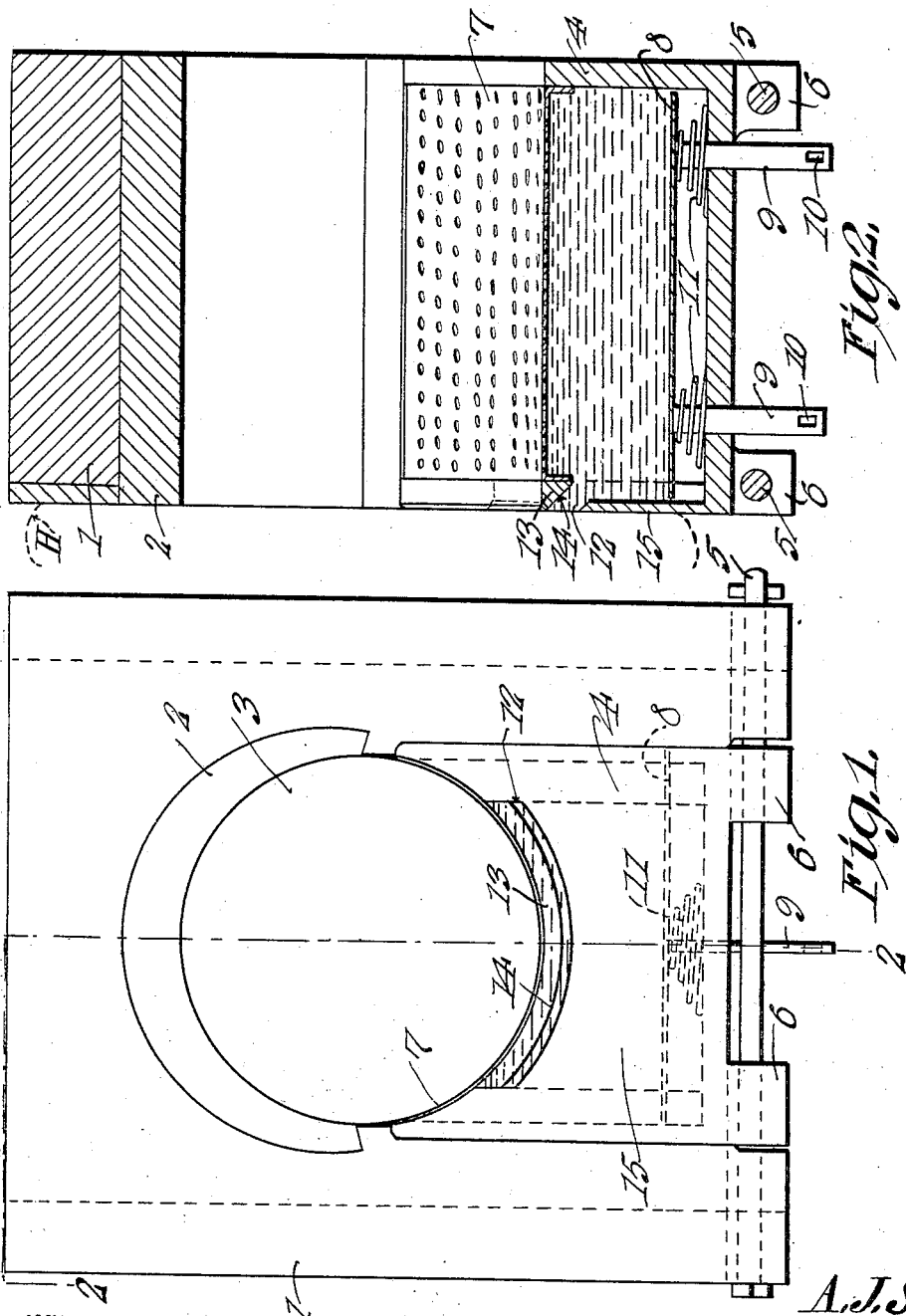
Witnesses
A. J. Sams
Inventor
by
Attorneys

UNITED STATES PATENT OFFICE.

ALBERT J. SAMS, OF CHICAGO, ILLINOIS.

GREASE-CELLAR.

1,236,879.     Specification of Letters Patent.     Patented Aug. 14, 1917.

Application filed September 25, 1916. Serial No. 122,111.

*To all whom it may concern:*

Be it known that I, ALBERT J. SAMS, a citizen of the United States, residing at Chicago, in the county of Cook and State of Illinois, have invented a new and useful Grease-Cellar, of which the following is a specification.

The present invention appertains generally to lubricating devices for journals, and aims to provide a grease cellar or receptacle provided with means, in addition to the means for lubricating the journal, for lubricating the face or end of the journal box and a hub or other member having a thrust bearing contact with the journal box, whereby the faces of the box and hub or other member are properly lubricated, to reduce the friction due to the thrust.

A further object of the invention is the provision of means which can be readily incorporated in ordinary grease cellars or receptacles of locomotive driving or bearing boxes for automatically lubricating the end thrust or face bearings of the driving or journal box and wheel hub, the invention being exceedingly simple and inexpensive, but being nevertheless thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein—

Figure 1 is a face view of a locomotive driving box illustrating the present improvements.

Fig. 2 is a section on the line 2—2 of Fig. 1.

As illustrated, the improvement is incorporated in a locomotive driving or bearing box 1, although it will be understood at the outset, that the present invention can be incorporated in various journal boxes or bearings for automatically lubricating end thrust face bearings between the box and member adjacent it. The box 1 is provided as usual with the "brass" or bearing 2 seating on the journal 3 of the axle, and the grease or lubricant cellar 4 of ordinary construction is fitted within the lower portion of the box 1, said cellar, however, being provided with novel means for supplying grease or lubricant to the face of the driving box and face of the wheel hub H which abuts against the face of the box 1. The cellar 4 is supported below the journal by means of transverse pins 5 inserted through the box and depending lugs 6 of the cellar, said pins being removable in order that the cellar can be removed and replaced. The cellar 4 has an upper curved wall 7 to fit the bottom of the journal and apertured for the flow of grease or lubricant upwardly therethrough to supply the grease to the journal.

A plunger plate 8 works within the cellar 4 and has depending shanks 9 slidable through the bottom of the cellar 4 to guide said plunger plate 8 for proper movement within the cellar. The shanks 9 have openings 10 adjacent to their lower ends to facilitate the downward movement of the plate 8 within the cellar when filling the same with grease above said plate. Expansion spiral springs 11 surround the shanks or stems 9 and are confined between the bottom of the cellar and the plate 8 for yieldably raising said plate to force the grease, as usual, up through the apertured top plate 7 against the journal. The grease is thus fed to the journal gradually.

The foregoing parts are common, and the present invention involves no special construction as over prevailing devices of this character, except as hereinafter pointed out. In carrying out the invention, the end wall 15 of the cellar 4 which is flush with the face of the box 1 is provided with an arcuate slot or opening 12 concentric with the journal 3 and top plate 7, and preferably extending to each side of the vertical plane of the axis of the journal 3. It is not necessary, however, that the opening 12 be in the form of a slot, since a series of openings or slots can be used, by simply dividing the slot 12 and the opening or openings can be of various sizes or arrangements. The opening or slot 12 is inclined transversely of itself from the interior of the cellar to the end or thrust face of the box 1, and there is an overhanging portion 13 above the slot 12. This overhanging portion is produced by rendering the end wall 15 thin below the slot 12, and the lower surface of the overhanging portion 13 is inclined, whereby the grease in being forced upwardly by the plunger plate 8 will be forced upwardly against the inclined surface 14, thus deflecting or directing a portion of the grease outwardly through the opening or slot 12 against the face of the hub H and to the face of the box 1. Thus, as the grease or lubricant is applied to the journal 3, a quantity of the grease is also applied to the end thrust or face bearings of the box and hub.

The present improvements can readily be incorporated in prevailing grease cellars, and provide admirable and effective means for lubricating the adjacent faces of the box and hub. It is simply necessary to provide the end wall 15 with the opening 12 and other portions above pointed out, and the plunger plate 8 should extend to the end wall 15 below the overhanging portion 13.

Having thus described the invention, what is claimed is:—

1. A lubricant receptacle having a portion to fit a journal and supply lubricant thereto, and having an opening in one end wall for the outlet of lubricant to a thrust bearing, the receptacle having means for deflecting the lubricant into said opening.

2. A grease cellar having an upper portion to fit a journal and supply grease thereto, one end wall of the cellar having an opening for the outlet of grease to a thrust bearing, and a spring raised plunger within the cellar for raising the grease, the cellar having means for deflecting the lubricant, when raised by the plunger, into said opening.

3. A grease cellar having an upper portion to fit a journal and supply grease thereto, and a spring raised plunger within the cellar for raising the grease, one end wall of the cellar having an opening for the outlet of grease above said plunger and inclined outwardly.

4. A grease cellar having an upper portion to fit a journal and supply grease thereto, and a spring raised plunger within the cellar for raising the grease, one end wall of the grease cellar having an opening for the outlet of grease to a thrust bearing, said end wall having an overhanging portion above said opening.

5. A grease cellar having an upper portion to fit a journal and supply grease thereto, and a spring raised plunger within the cellar, one end wall of the cellar having an opening for the outlet of grease to a thrust bearing, said end wall having an overhanging portion above said slot, and the lower surface of said overhanging portion being inclined to deflect grease outwardly through said slot.

In testimony that I claim the foregoing as my own, I have hereto affixed my signature in the presence of two witnesses.

ALBERT J. SAMS.

Witnesses:
C. J. EONOHN,
E. A. AGUR.

Copies of this patent may be obtained for five cents each, by addressing the "Commissioner of Patents, Washington, D. C."